United States Patent [19]

Uebelhart et al.

[11] 3,855,377

[45] Dec. 17, 1974

[54] METHOD FOR IMPROVING INTERNAL FOAM FUSION OF MOLDED STYRENE POLYMER FOAM BILLETS

[75] Inventors: James J. Uebelhart, Beaver; John P. Spicuzza, Jr., Pittsburgh, both of Pa.

[73] Assignee: Arco Polymers, Inc., Glenolden, Pa.

[22] Filed: Oct. 24, 1972

[21] Appl. No.: 300,293

[52] U.S. Cl............ 264/51; 264/53, 264/210 R, 264/DIG. 9, 264/DIG. 10, 264/DIG. 65
[51] Int. Cl............................................ B29d 7/00
[58] Field of Search....... 264/51, 53, 210 R, DIG. 9, 264/DIG. 10, DIG. 65

[56] References Cited
UNITED STATES PATENTS

| | | | |
|---|---|---|---|
| 3,023,175 | 2/1962 | Rodman | 264/DIG. 10 |
| 3,233,016 | 2/1966 | Kracht | 264/53 |
| 3,417,170 | 12/1968 | Knapp | 264/51 |
| 3,577,360 | 5/1971 | Immel | 264/53 |
| 3,709,651 | 1/1973 | Rivat-Lahousse | 264/51 |

OTHER PUBLICATIONS

Koppers Bulletin, C–g–273, May 2, 1960, p. 1–7.

*Primary Examiner*—Donald E. Czaja
*Assistant Examiner*—Eugene C. Rzucidlo
*Attorney, Agent, or Firm*—Lewis J. Young

[57] ABSTRACT

Molded billets of foamed styrene polymers having improved internal fusion are prepared by the addition to the standard molding technique of a presteam cycle between the fill cycle and the fusion cycle. The presteam cycle comprises heating the contents of the mold with a mixture of 20–50 psig. steam and 30–60 psig. air in a ratio of steam to air pressures of between 20 to 60 and 50 to 40. Addition of the presteam cycle makes possible both the elimination of the preheat cycle and the shortening of the fusion cycle.

10 Claims, No Drawings

METHOD FOR IMPROVING INTERNAL FOAM FUSION OF MOLDED STYRENE POLYMER FOAM BILLETS

BACKGROUND OF THE INVENTION

This invention relates to a process for producing thick-section moldings of foamed styrene polymers.

The formation of molded articles from expandable styrene polymer particles is effected in two steps: (1) pre-expanding of foamable styrene polymer particles to a density of between 1 and 2 pounds per cubic foot; and (2) further heating the pre-expanded particles in a closed mold to cause further expansion and form a fused, one piece article having the shape of the mold. The second step is what is normally referred to as "molding."

The pre-expansion step may be carried out by heating the expandable polymer pellets by any suitable heating medium such as steam, hot air, hot water, or radiant heat. An excellent method of pre-expansion of the particles is a process such as that disclosed in U.S. Pat. No. 3,023,175 by Rodman. Another excellent method is that disclosed in U.S. Pat. No. 3,577,360 by Immel, which teaches the pre-expansion of polymer beads by heating in a dry atmosphere followed by the application of a vacuum to cause the particles to expand to the desired density.

The molding step normally comprises 4 cycles: (1) the preheat cycle in which the empty mold is preheated with steam; (2) the fill cycle in which the mold is filled with pre-exapnded polymer particles; (3) the fusion cycle in which the mold is closed and heated with steam to further expand the particles therein and cause the particles to fuse together; and (4) the cool cycle in which the mold is cooled, usually with recirculating water, or the application of vacuum, to cool the polymer below the softening point of the polymer, the mold is opened and the molded foamed molding is removed from the mold.

The molding of large cross-section (thick-section) billets of foamed styrene polymers, that are greater than one foot in the smallest dimension, presents many problems not encountered in the molding of thin section parts. Principal among these problems is the fact that as the particles expand in the fusion cycle against the hot mold surfaces, the surface of the billet fuses into a solid surface which insulates the core or center portion of the billet from the heating medium. The resulting molded billet thus has a well-fused surface but has decreasingly good fusion as the core of the billet is approached. This decreased internal fusion of the billet is highly undesirable because the core particles tend to break away from one another or crumble, when the billet is cut up into smaller sizes.

A further problem in the molding of large billets is that during the preheat cycle large amounts of steam are required to heat the massive molds. The preheat cycle is done with the vent drains of the mold open to permit the drainage of condensed water from the mold. The preheat cycle is normally necessary because if the mold is cold when the fusion cycle is begun, the steam used for expanding the particles condenses on the surface of the cold mold causing excess water to be present during the fusion cycle. The water thus formed tends to prevent fusion between the particles and to produce water-wet moldings.

SUMMARY OF INVENTION

We have now found that the internal fusion of thick-section foam moldings of styrene polymers can be improved by means of a presteaming cycle using mixtures of steam and air as the heating medium immediately prior to the fusion cycle of the molding process. This presteaming cycle may be used in combination with the preheat cycle or may be used instead of the preheat cycle, thus allowing the elimination of the preheat cycle from the molding process.

DETAILED DESCRIPTION OF INVENTION

The process of the present invention can be carried out on any of the presses or machines commercially available for the molding of shaped articles from expandable or pre-expanded polymers. The presses usable in the present process must be equipped with means to introduce steam and air into the mold cavity at any desired portion of the molding cycle.

The styrene polymers for which the invention is applicable may be any of the vinyl aryl polymers made by the polymerization of vinyl aryl monomers such as styrene, alpha-methylstyrene, nuclear methylstyrenes, ethylstyrenes, p-isopropylstyrene, p-tert-butylstyrene, p-methoxystrene, chlorostyrenes, dichlorostyrenes, bromostyrenes and the like. Also useful are the copolymers of these vinyl aryl monomers with minor amounts (less than 30 mole- percent) of other monomers, such as acrylonitrile, butadiene, monocarboxylic acids such as acrylic acid and methacrylic acid, dicarboxylic acids such as maleic acid, fumaric acid, itaconic acid, and their anhydrides, half-esters and esters.

Especially useful are polystyrene, and copolymers of styrene with 5–30 mole- percent of acrylonitrile, maleic anhydride, or methyl acid maleate.

The styrene polymers may be in the form of beads, granules, or other particles convenient for molding operations. Especially useful are the beads formed by the suspension polymerization of the vinyl aryl monomers alone or in combination with the minor amount of copolymerizable monomers.

The expandable styrene particles comprise the styrene polymers having impregnated therein a suitable blowing agent. Suitable blowing agents are the volatile aliphatic or cycloaliphatic hydrocarbons, having one to seven carbon atoms in the molecule, such as methane, ethane, propane, butane, pentane, hexane, heptane, petroleum ether, cyclopentane, cyclohexane, cyclopentadiene, and their halogenated derivatives which have a boiling point below the softening point of the polymer such as dichloroethylene, isopropyl chloride, methyl chloride, dichloroethane, dichlorodifluoromethane, and the like. Other suitable blowing agents are acetone, methanol, methyl acetate, ethyl acetate, methyl formate, ethyl formate, propionaldehyde, dipropyl ether, and the like and mixtures thereof which have a boiling point lower than the softening point of the polymer. The blowing agent, or expanding agent, is generally present in amounts between 3 and 15 percent by weight of the polymer.

The expandable particles are first pre-expanded to a bulk density of about 1 pound per cubic foot by, for example, the process of Immel, U.S. Pat. No. 3,577,360. The pre-expanded particles are called prepuff particles at this stage. The prepuff particles are capable of further expansion on heating and are thus suitable for the molding process of the present invention.

the known method of molding comprises generally 4 cycles:

(1) the preheat cycle; (2) the mold fill cycle; (3) the fusion cycle; and (4) the cooling cycle.

In the present invention, a presteaming cycle is used after the mold fill cycle. This presteaming cycle may be used as a fifth cycle as indicated, or may be used instead of the preheat cycle.

To eliminate the formation of condensation in the mold when steam is used for the fusion cycle, the mold is preheated while empty. The resulting hot mold surface tends to heat the prepuff at the surface of the molded article, before the core of the article is heated during the fusion cycle. This premature heating of the surface forms an insulating skin on the article and thus prevents efficient heating and fusion of the prepuff in the core. The resulting article having a non-fused, crumbly core is highly undesireable.

It has now been possible to eliminate the preheat cycle and fill the mold while cold, if one uses a presteaming cycle after the fill cycle. Thus, in this embodiment of the invention, the mold is filled cold, and a presteaming cycle comprising introducing a mixture of steam and air into the filled mold is used. The mixture of steam and air heats the prepuff throughout the article to be molded with the result that the core prepuff is expanded equally with the skin material. Subsequent introduction of pure steam during the fusion cycle then causes more uniform expansion and fusion with a minimum of skin formation. The resulting article has better internal fusion than previously possible using the preheat cycle alone.

Surprisingly, we have also found that better internal fusion can be obtained, if the presteaming cycle is used, even when the preheat cycle is not eliminated. In this embodiment, the mold is preheated empty, the mold is filled with prepuff, the mixture of steam and air is introduced into the filled mold, steam alone is used for the fusion cycle, and then the mold is cooled, opened and the molded article removed.

The normal molding techniques might comprise a 15 second preheat with 30 psig. steam; fill; 25 second fuse with 30 psig. steam; and cool. The technique embodied in the invention might comprise fill; 30 second presteam with a mixture of 30 psig. steam and 40 psig. air; 25 second fuse with 30 psig. steam; and cool. Generally, the steam header pressure used for the preheat cycle is the same as that used in the fuse cycle and in the preheat cycle (if used).

The steam-air mixtures found to be especially useful in the invention are those having from 20–50 psig. of steam and from 30–60 psig. of air. The ratio of steam pressure to air pressure may be varied within the practical limits of the molding press used, but the preferred ratios are between 20:60 (steam:air) and 50:40. The presteaming cycle has been shown to be particularly effective when used for 30 second. Longer presteaming was not as effective for some unknown reason. Higher air pressure at a given steam pressure was shown to be more effective in improving the internal fusion. Thus, a presteam cycle comprising a mixture of 30 psig. steam pressure and 40 psig. air pressure for 30 seconds gave 23 percent increase in internal foam fusion when used instead of a preheat cycle comprising 30 psig. steam pressure for 15 seconds. When the presteam cycle comprised a mixture of 30 psig. steam pressure and 60 psig. air pressure for 30 seconds was used, the internal fusion was increased by 54 percent. Thus increasing the air pressure in the steam air mixture from 40 to 60 psig. increased the internal fusion by 31 percent.

The following examples further illustrate the invention. All moldings were performed on polystyrene prepuff having a density of 1.0 pound per cubic foot using a mold having dimensions of 98 inches × 25 inches × 18 inches. The internal fusion was measured by cutting a 1 inch slice from the center of the molded article and visually counting the number of fused particles per unit area.

EXAMPLE I

To illustrate the increased internal fusion obtained using a presteam cycle instead of a preheat cycle, several billets were molded using the standard system of preheat, fill, fuse, and cool of comparison and also using the system of fill, presteam, fuse and cool. The results and the conditions for each molding are shown in Table I. The starting prepuff for the A-series was a prepuff made from expandable polystyrene beads having a bead diameter of between 0.023 and 0.033 inches. All other samples were molded from beads having a diameter of between 0.047 and 0.079 inches. In all runs, the fusion cycle comprised a 25 second fusion with 30 psig. steam using a 14 psig. back pressure.

Table I

| Run No. | PREHEAT | | PRESTEAM | | | Internal Fusion, % Fused | Increase In Fusion % |
|---|---|---|---|---|---|---|---|
| | Steam header pressure, PSIG | Preheat time, sec. | Steam header pressure, PSIG | Air pressure PSIG | Presteam Time, Sec. | | |
| Control A | 30 | 15 | — | — | — | 16 | — |
| A-2 | — | — | 30 | 60 | 30 | 26 | 62.5 |
| Control B | 30 | 15 | — | — | — | 26 | — |
| B-1 | — | — | 30 | 40 | 30 | 32 | 23.0 |
| Control C | 30 | 15 | — | — | — | 12 | — |
| C-1 | — | — | 30 | 40 | 15 | 24 | 100 |
| Control D | 30 | 15 | — | — | — | 54 | — |
| D-1 | — | — | 30 | 60 | 30 | 70 | 31.5 |
| Control E | 30 | 15 | — | — | — | 20 | — |
| E-1 | — | — | 30 | 40 | 30 | 24 | 20.0 |

Similar effects have been noted when the presteam cycle was used in molding billets from copolymers of styrene with minor amounts of acrylonitrile, maleic anhydride, or methyl acid maleate.

EXAMPLE II

The effect of higher air pressure during the presteam cycle was determined by molding several billets under identical conditions except that the air pressure in the presteam cycle was varied. The results are shown in Table II.

to the results in run A-4, no decrease of internal fusion was noted for run E-4.

EXAMPLE III

That the preheat cycle need not be eliminated from the molding process was shown by molding polystyrene prepuff without preheating and also using the process of preheat, fill, presteam, fuse and cool. The results are shown in Table III. As in all previous examples, the fusion cycle was set at 25 seconds with steam pressure identical to that used in the other cycles and with a 14 psig. back pressure on the mold.

Table II

| | PREHEAT | | PRESTEAM | | | | |
|---|---|---|---|---|---|---|---|
| Run No. | Steam header pressure, PSIG | Pre-heat time, sec. | Steam header pressure PSIG | Air Pressure PSIG | Pre-Steam Time Sec. | Internal Fusion, % Fused | Increase In Fusion % |
| Control A | 30 | 15 | — | — | — | 16 | — |
| A-1 | — | — | 30 | 40 | 30 | 12 | 0 |
| A-2 | — | — | 30 | 60 | 30 | 26 | 62.5 |
| A-4 | — | — | 30 | 60 | 60 | 15 | 0 |
| Control B | 30 | 15 | — | — | — | 26 | — |
| B-1 | — | — | 30 | 40 | 30 | 32 | 23.0 |
| B-2 | — | — | 30 | 60 | 30 | 40 | 54.0 |
| Control E | 30 | 15 | — | — | — | 20 | — |
| E-1 | — | — | 30 | 40 | 30 | 24 | 20.0 |
| E-2 | — | — | 30 | 60 | 30 | 30 | 50.0 |
| E-4 | — | — | 30 | 60 | 60 | 30 | 50.0 |

TABLE III

| | PREHEAT | | PRESTEAM | | | | |
|---|---|---|---|---|---|---|---|
| Run No. | Steam header pressure PSIG | Pre-heat time, sec. | Steam header pressure, PSIG | Air Pressure, PSIG | Pre-Steam Time, Sec. | Internal Fusion, % Fused | Increase in Fusion, % |
| Control A | 30 | 15 | — | — | — | 16 | — |
| A-2 | — | — | 30 | 60 | 30 | 26 | 62.5 |
| A-3 | 30 | 15 | 30 | 60 | 30 | 26 | 62.5 |
| A-5 | — | — | 20 | 30 | 40 | 15 | * |
| A-6 | 20 | 15 | 20 | 30 | 40 | 50 | * |
| Control B | 30 | 15 | — | — | — | 26 | — |
| B-3 | 48 | 15 | 48 | 40 | 30 | 34 | * |
| Control D | 30 | 15 | — | — | — | 54 | — |
| D-1 | — | — | 30 | 60 | 30 | 70 | 31.5 |
| D-2 | 20 | 15 | 20 | 60 | 30 | 72 | * |
| Control E | 30 | 15 | — | — | — | 20 | — |
| E-2 | — | — | 30 | 60 | 30 | 30 | 50.0 |
| E-3 | 30 | 15 | 30 | 60 | 30 | 40 | 100.0 |
| E-5 | — | — | 20 | 40 | 30 | 32 | * |
| E-6 | 20 | 15 | 20 | 40 | 30 | 28 | * |

*The increase in % fusion could not be calculated for these runs because no control was available at the 20 and 48 psig. steam header pressures.

It is noted that for the smaller particles of prepuff used in the A-series of runs, the use of 40 psig. air pressure under the conditions of run A-1 gave a slight decrease in internal fusion rather than an increase. Increasing the air pressure to 60 psig. for 30 seconds, gave a 62.5 percent increase in internal fusion. Increasing the time of presteaming from 30 to 60 seconds caused a decrease in internal fusion again.

The larger diameter prepuff used in the B and E series of runs gave increased internal fusion at 40 psig. air pressure and a further increase in internal fusion is noted on raising the pressure to 60 psig. Run E-4 illustrates that no improvement in internal fusion was obtained by increasing the presteam cycle time. Contrary Comparison runs A-2 with A-3 and E-2 with E-3 show that the inclusion of the preheat cycle has not harmed the moldings made with a presteam cycle. In fact E-3 indicates that with the larger beads, better internal fusion is obtained with the combined preheat-presteam cycles than when presteam alone is used.

It should be noted that the runs using 20 psig. steam header pressure gave billets having appreciable internal fusion as well as those using the 30 and 48 psig. steam header pressure.

EXAMPLE IV

Prepuff made from the larger diameter polystyrene beads were molded as follows: the mold was preheated with 30 psig. steam for 15 seconds, filled and then the presteaming cycles as shown in the Table IV were used. The fusion cycle was also varied as shown in the table. Results of the fusion of the articles is shown.

Table IV

| | PRESTEAM | | | FUSION | | | |
|---|---|---|---|---|---|---|---|
| Run No. | Steam header pressure, PSIG | Steam header Pressure, PSIG | Pre-steam Time, Sec. | Time Sec. | Back Pressure PSIG | Internal Fusion % Fused | Increase In Fusion, % |
| Control F | — | — | — | 25 | 14 | 12 | — |
| F-1 | 30 | 40 | 15 | 10 | 14 | 14 | 16.3 |
| F-2 | 30 | 40 | 20 | 6 | 14 | 16 | 33.3 |

From these results, it can be seen that the use of a presteam cycle makes possible the reduction of time required for the fusion cycle.

What is claimed is:

1. A method of forming a shaped foamed styrene polymer article from partially expanded styrene polymer particles capable of further expansion comprising:
   a. filling a cold mold that defines the shape of the article with partially expanded styrene polymer particles;
   b. presteaming the particles to a temperature just below the fusion temperature of the particles by introducing a mixture of 20–50 psig. steam and 30–60 psig. air into the filled mold in a ratio of steam to air pressures of between 20 to 60 and 50 to 40, for a time of between 15 and 40 seconds, whereby the particles are uniformly heated throughout the mold;
   c. fusing the presteamed particles by introducing 20–50 psig. steam into the mold whereby the particles are caused to further expand and fuse together to form a foamed article conforming to the shape of the mold;
   d. cooling the mold; and
   e. removing said shaped, fused article from the mold.

2. The method of claim 1 wherein the styrene polymer particles are polystyrene.

3. The method of claim 1 wherein the styrene polymer particles are a copolymer of styrene with minor amounts of acrylonitrile.

4. The method of claim 1 wherein the styrene polymer particles are a copolymer of styrene with minor amounts of maleic anhydride.

5. The method of claim 1 wherein the styrene polymer particles are a copolymer of styrene with minor amount of methyl acid maleate.

6. A method of forming a shaped foamed styrene polymer article from partially expanded styrene polymer particles capable of further expansion comprising:
   a. preheating a mold that defines the shape of the article by introducing 20–50 psig. steam into the mold while allowing any condensed water to drain therefrom;
   b. filling the preheated mold with partially expanded styrene polymer particles;
   c. presteaming the particles to a temperature just below the fusion temperature of the particles by introducing a mixture of 20–50 psig. steam and 30–60 psig. air into the filled mold in a ratio of steam to air pressure of between 20 to 60 and 50 to 40, for a time of between 15 and 40 seconds, whereby the particles are uniformly heated throughout the mold;
   d. fusing the presteamed particles by introducing 20–50 psig. steam into the mold, whereby the particles are caused to further expand and fuse together to form a foamed article conforming to the shape of the mold;
   e. cooling the mold; and
   f. removing said shaped, fused article from the mold.

7. The method of claim 6 wherein the styrene polymer particles are polystyrene.

8. The method of claim 6 wherein the styrene polymer particles are a copolymer of styrene with minor amounts of maleic anhydride.

9. The method of claim 6 wherein the styrene polymer particles are a copolymer of styrene with minor amounts of maleic anhydride.

10. The method of claim 6 wherein the styrene polymer particles are a copolymer of styrene with minor amounts of methyl acid maleate.

* * * * *

UNITED STATES PATENT OFFICE
CERTIFICATE OF CORRECTION

Patent No. 3,855,377            Dated 12/17/74

Inventor(s) James J. Uebelhart & John P. Spicuzza, Jr.

It is certified that error appears in the above-identified patent and that said Letters Patent are hereby corrected as shown below:

In the Claims:

Claim 1, Column 7, line 22, after the word "expansion" insert ---, said article being a thick-section billet whose smallest dimension is greater than one foot,---

Claim 1, Column 7, line 23, after the word "cold" insert ---thick section---

Claim 6, Column 8, line 4, after the word "expansion" insert ---, said article being a thick section billet whose smallest dimension is greater than one foot,---

Claim 6, Column 8, line 17, after the words "preheating a" insert ---thick section---

Signed and sealed this 18th day of March 1975.

(SEAL)
Attest:

RUTH C. MASON
Attesting Officer

C. MARSHALL DANN
Commissioner of Patents
and Trademarks